Oct. 24, 1944.   C. E. JOHNSON   2,361,107

SELF LOCKING VALVE TAPPET SCREW

Filed March 8, 1944

Inventor
Charles E. Johnson
By Liverance and
Van Antwerp
Attorneys.

Patented Oct. 24, 1944

2,361,107

UNITED STATES PATENT OFFICE 2,361,107

SELF-LOCKING VALVE TAPPET SCREW

Charles E. Johnson, Muskegon, Mich.

Application March 8, 1944, Serial No. 525,537

7 Claims. (Cl. 151—22)

This invention relates to tappets which are mounted for reciprocation between operating cams therefor and valves, which the movements of the tappets control, particularly in connection with internal combustion engines.

Because of the conditions under which tappets operate and where they are located, it has been a general practice to insert and connect at the upper end of a hollow tappet body a screw which is threaded into said body for adjustment to different positions to properly fill the space between the lower end of a valve stem and a cam against the lower end of which the tappet body bears. For many years, after a proper adjustment of the screw into the body had been made, a locking nut was used through which the screw passed and which was operated into tight locking engagement against the upper end of the tappet body. Endeavor has been made in recent years to dispense with the necessity of using the locking nut, the tightening and locking of which might and frequently did disturb the rather delicate and accurate adjustment and positioning of the tappet screw in order to obtain the best results and avoid so-called "tappet noises" and still maintain the proper opening and closing of the valves, in the operation of the engine, which were not only annoying to hear and taking into consideration the large number of tappets used with modern internal combustion engines in motor vehicles, two for each cylinder, were extremely hard to entirely eliminate with a consumption of a great deal of time for adjusting when the lock nut type adjusting screw is used.

The present invention is one which I have produced after devising and using other attempted and not fully satisfactory solutions of the problem, that is, the adjustable mounting of a tappet screw into the end of a tappet body with complete assurance that the screw will stay in place at any position to which adjusted, and without requiring the use of a third element, namely, a locking nut for such purpose. The present invention provides a particularly simple and satisfactory tappet screw structure, one which is very easily practiced with the production of tappets by a method of simple and practical nature.

Figure 1:
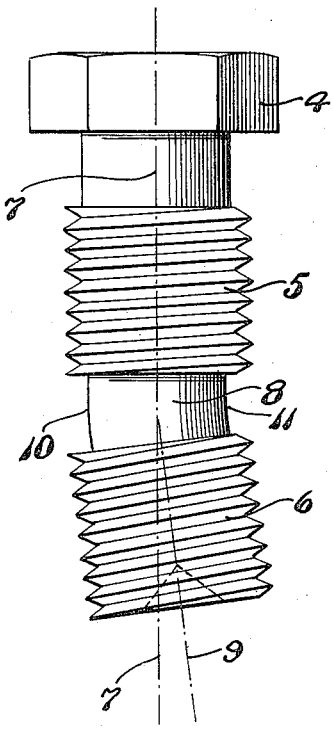
Figure 2:
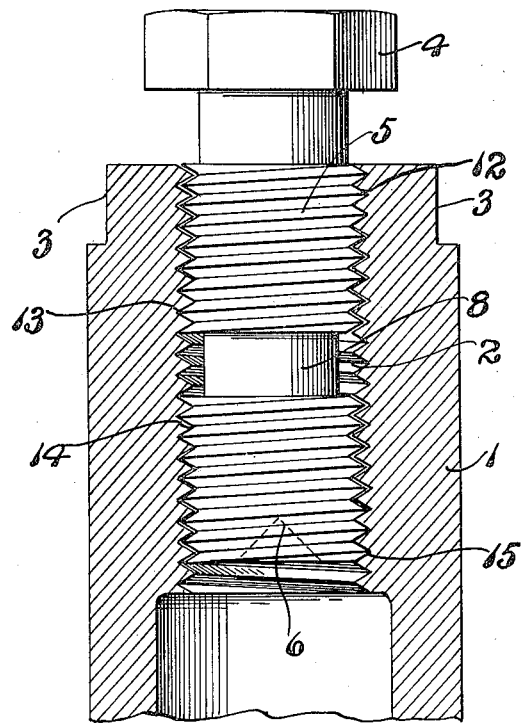

An understanding of the invention may be had from the following description, taken in connection with the accompanying drawing, in which, Fig. 1 is an elevation of the tappet screw made in accordance with my invention with the lower end of the tappet screw shown bent angularly to one side and illustrated in a highly exaggerated form, and Fig. 2 is a fragmentary section through the upper end of a tappet body with the screw as in Fig. 1 threaded thereinto and held securely and positively in any position to which it is adjusted.

Like reference characters refer to like parts in the different figures of the drawing.

With my invention the tappet body 1, which normally is of a hollow cylindrical form, though it does not necessarily have to be hollow, is interiorly bored from its upper end downwardly a necessary distance and interiorly threaded as indicated at 2, and also provided with flat surfaces at opposite sides at its upper end as indicated at 3, the same as in previous tappet bodies. As will be understood, at the lower end of the tappet body is a bearing end or head suitably hardened which rides against the surface of a cam on a rotatably driven cam shaft in an internal combustion engine.

The tappet screw has a head 4, shaped to be engaged by a wrench, from which a shank extends downwardly. With my invention the shank is threaded to provide upper and lower threaded sections 5 and 6, the axis of the shank indicated at 7 being initially the common axis of both of the screw threaded sections 5 and 6. The screw threaded sections 5 and 6 are separated by a cutting away of the metal to provide an annular groove leaving a cylindrical portion between the screw sections 5 and 6 as indicated at 8. The portion 8 may be formed before the threads of the sections 5 and 6 are machined or it may be done later, there being in such case a cutting of the threads from the upper end of the section 5 to the lower end of the section 6, the intervening threads between being removed on machining the groove around the portion 8.

With my invention after the groove which separates the threaded sections 5 and 6 has been machined, the shank is bent at the section 8 laterally to one side, thereby locating the longitudinal axis of the lower section 6 in angular relation to the previous common axis 7 of the two threaded sections 5 and 6, or as indicated at 9. As previously mentioned the drawing in Fig. 1 shows a greatly exaggerated bending over what actually in practice is used and indicates the stretching of the shank at the round portion 8 at one side as at 10 and a corresponding shortening at 11 at the opposite side.

For example, to set forth a practical construction, the length of the screw threaded sections 5 and 6, which preferably will be of approximately the same lengths, is for each, $\frac{5}{16}$" and the width of the groove around the portion 8 before the bend, is $\frac{1}{8}$". From the center of the part 8 to the outer end of the threaded section 6 will be $\frac{3}{8}$". As I have practiced the invention in actual performance the distance that the axis indicated at 9 is offset from the previous axis at 7 at the lower end of the section 6 is .004". This distance may be varied without changing the invention, but with the longitudinal dimensions of the screw threaded sections 5 and 6 and the width of the groove at 8 approximately as stated, the offset distance of the axis at 9 from the previous axis at 7 at the outer end of the threaded section 6 should not in general be greater than .008" or appreciably less than .004".

This example given is not to be considered as limiting the invention in any way but as illustrative of what I have found to be a practical construction in which the axial lengths of the screw threaded sections approximate the lengths given. Of course while preferably the axial lengths of the sections 5 and 6 are to be substantially equal, there may be variations therefrom also as the invention is not essentially based upon exact or substantial equality in the axial lengths of the sections 5 and 6.

Upon entering the lower end of the lowermost threaded section 6 into the interiorly threaded bore 2 of the tappet body, the screw is threaded inwardly quickly and easily for the full length of the section 6 until the lowermost threads of the upper section 5 engage the interior threads 2. When this occurs, and more and more as the screw is threaded inwardly, the permanent bend which has been made in the shank at the annular groove 8 is tended to be forced back so as to straighten and bring again into alinement the longitudinal axes of the upper and lower sections 5 and 6. When the screw has been through the machine and bending steps which have been described the screw is hardened; and by reason of its resiliency from such hardening strongly resists a return to the original longitudinal axis positions of the two sections 5 and 6. Therefore, as illustrated in Fig. 2 the upper threads of the upper section 5 bear very strongly and tightly against the interior threads 2 at the upper end of the tappet body as shown at 12 Fig. 2, while the lowermost threads of the upper section 5 bear with heavy force against the interior threads 2 at the lower part of section 5 at the opposite side also as shown in Fig. 2. Similarly the upper threads of the lower section 6 bear tightly and strongly against the interior threads 2 immediately below the place where the lower threads 5 bear against said interior threads 2, as indicated at 14, while the lower threads of the section 6 bear strongly against the interior threads 2, as at 15, below the place at 12 where the upper threads of the upper section 5 have their strongest and tightest engagement. Therefore, the locking tension of the screw with the interior threads of the tappet body is greatest at 12, 13, 14 and 15 as shown in Fig. 2.

This causes a very tight frictional engagement of the threads of the sections 5 and 6 with the interior threads 2 of the tappet body, the engagement being so strong that the screw is insured against any turning except upon the application of a relatively heavy force, and which in practice must be applied at the end of a wrench engaged with the head 4 of the screw, the tappet body 1 being held against rotative movement as by a wrench engaging the flats at 3 and with the consequent multiplication of force application through the leverage exerted by the wrenches. There is complete and positive certainty that the screw will not change its position under all service to which the tappet may be subjected.

Having thus fuly described the invention what I desire to claim and secure by Letters Patent is as follows:

I claim:

1. A tappet body having an interiorly threaded opening at an end thereof extending axially a distance into the body and an adjustable tappet screw having a head and a hardened threaded shank, said threaded shank between the ends of the threads thereon being bent laterally to locate the axes of the threaded shank portions at opposite sides of the bend at a slight angle to each other, the length of the interior threaded portion of the body being in excess of the length of the threads on the shank at either side of the bend in said shank.

2. A tappet body interiorly bored and threaded a distance from one end to receive an adjustable tappet screw, and a tappet screw having a head at one end and threaded sections extending therefrom, said head and threaded sections and shank being hardened, and the shank between the end threads of said threaded portions having a continuous annular groove therearound to separate the threads into two sections, the shank being bent to locate the axis of the outer threaded section at a slight angle to the axis of the remainder of the shank, said bending of the shank being at said groove thereof.

3. A construction containing the elements in combination defined in claim 2, said groove between the two threaded sections being substantialy midway between the upper and lower threads to provide two threaded sections of substantially equal length, one at each side of said groove.

4. The process of constructing an adjustable tappet screw which consists, in providing a screw blank having a head and a shank extending therefrom, threading said shank from the end thereof opposite the head toward said head, bending the shank between the ends of the threaded portions thereof to dispose the axis of one portion of the screw threads at a slight angle to the axis of the other threaded portion, and thereafter hardening the tappet screw to render it resilient and resistant against return bending of the shank to its initial position.

5. The process of constructing a screw for adjustable tappets adapted to be threaded into a tappet body which consists, in providing a screw blank having a head and a shank extending therefrom, cutting threads on said shank and separating the threads cut into two sections by machining away an intermediate portion of the shank to provide a continuous annular groove between the two threaded sections, bending the shank at said groove laterally a short distance to locate the axes of said screw threaded sections at a slight angle to each other, and hardening said screw to hold the axes of the two screw threaded sections at said angle to each other and resist return to or toward their initial positions, as specified.

6. The process defined in claim 5, wherein the cutting of the groove to be interposed between the two screw threaded sections is at a location whereby the two threaded sections are of substantially the same axial lengths.

7. An adjustable tappet screw having a hardened head and shank, said shank having upper and lower separated threaded sections with a plain unthreaded portion between, the lower section having its axis located at a slight angle to the axis of the upper section, said unthreaded portion between the threaded sections being slightly bent to locate said axes at said angle to each other.

CHARLES E. JOHNSON.